United States Patent

[11] 3,596,280

[72] Inventors Donald N. Campbell;
Miles Schwartz; Kenneth K. Konrad, all of Lewisburg, W. Va.
[21] Appl. No. 769,352
[22] Filed Oct. 21, 1968
[45] Patented July 27, 1971
[73] Assignee The Bendix Corporation

[54] DATA RETRIEVAL RECORDER
5 Claims, 5 Drawing Figs.
[52] U.S. Cl. ................................................ 346/30, 346/44, 346/134
[51] Int. Cl. ............................................... G01d 9/26
[50] Field of Search ........................................ 346/44, 65, 66, 29, 30, 134, 1; 235/61.12, 61.6 A; 73/23.1; 129/16.1

[56] References Cited
UNITED STATES PATENTS

| 2,467,808 | 4/1949 | Canada | 346/29 X |
| 2,739,030 | 3/1956 | Kruse | 346/76 |
| 2,750,575 | 6/1956 | Doty et al. | 346/66 UX |
| 3,019,072 | 1/1962 | Bose et al. | 346/29 |
| 3,182,331 | 5/1965 | Marshall | 346/1 |
| 3,315,562 | 4/1967 | Sauer et al. | 355/2 X |
| 3,380,065 | 4/1968 | Alpert et al. | 346/29 |
| 2,381,188 | 8/1945 | Swindle | 346/134 X |
| 3,363,260 | 1/1968 | Garbe | 346/134 X |
| 3,518,696 | 6/1970 | Tomota et al. | 346/134 X |

OTHER REFERENCES
Bulletin 739-A; Beckman IR-7 Prism-Grating Infrared Spectrophotometer; Beckman Instruments, Inc.; May 1959; 20 pp.
Bulletin 714-A; Beckman IR-4; Beckman Instruments, Inc.; June 1959; 21 pp.
Zitnik et al.; Design of a Centralized Electrocardiographic and Vectorcardiographic System; The American Journal of Cardiology; Vol. 19; June 1967; pp. 818— 826

Primary Examiner—Richard B. Wilkinson
Attorneys—Ernest T. Hix and Plante, Arens, Hartz and O'Brien ABSTRACT: There is disclosed a novel recorder and recording system described as applied to recording data from a source such as a gas chromatograph. Normal recording of the data in such an illustrative application is accomplished using a conventional strip chart recorder having a constant feed rate of "X" inches per minute. In this disclosure a recorder is used having a record card of predetermined coordinate height and length, representing time, and signal amplitude. This recorder is equipped with a variable time scale adjustment wherein data of practically any time duration may be placed within the predetermined time coordinate length. Mechanical search and retrieval indicia representative of the recorded data is placed on the recorder record card for ready retrieval from a file collection of such cards at any later time.

INVENTORS
DONALD N. CAMPBELL
MILES SCHWARTZ
KENNETH K. KONRAD

ATTORNEY

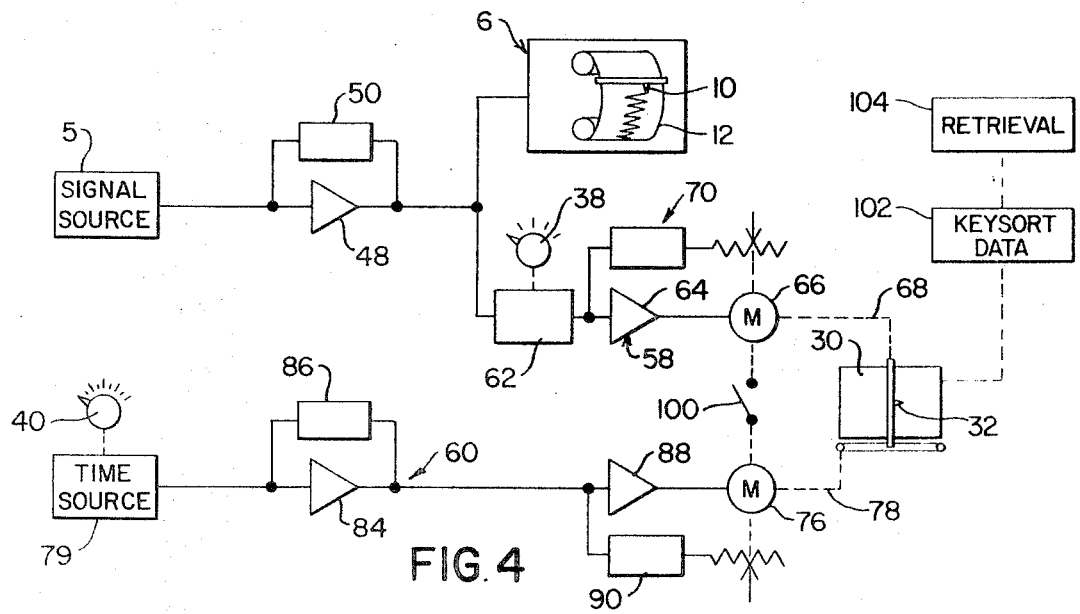
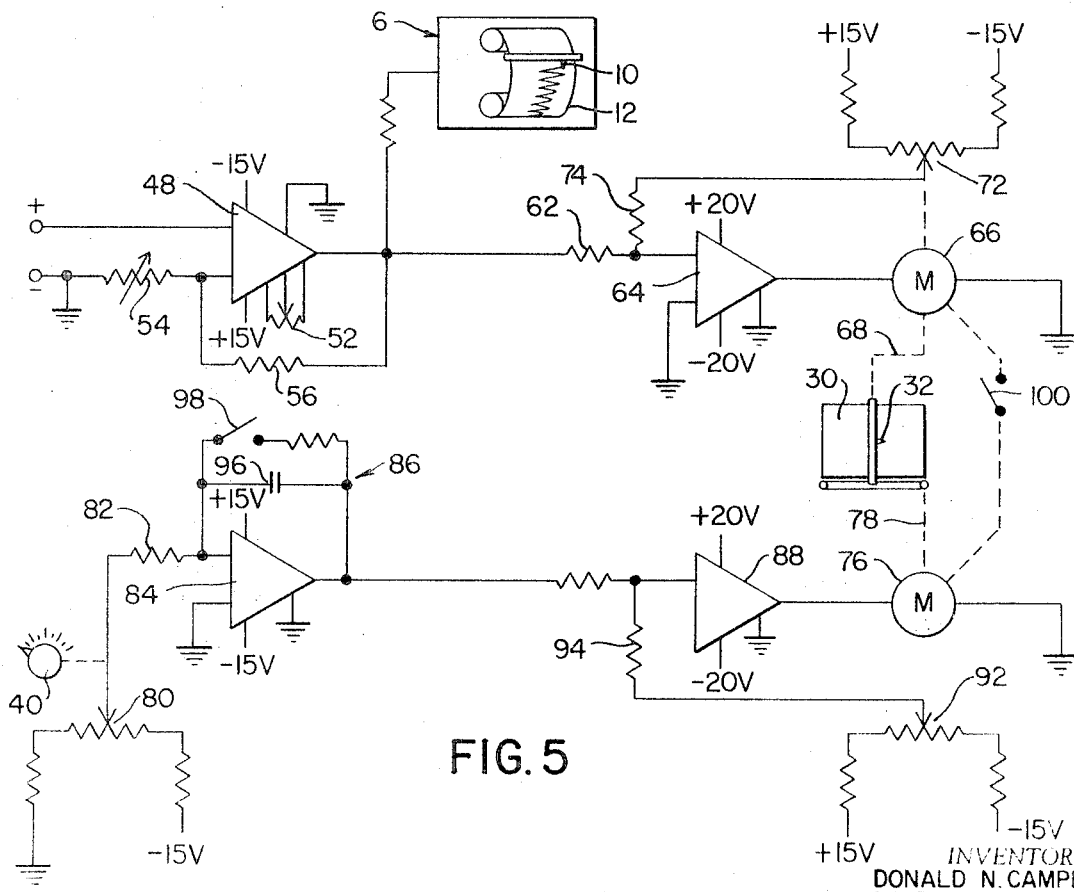

DATA RETRIEVAL RECORDER

BACKGROUND OF THE INVENTION

This invention pertains to recorders and more particularly to a recording system providing for recording data on retrievable recording surfaces having predetermined coordinate lengths which can be used independently or along with simultaneous recording of the same data by conventional recording means.

Normal recording of chromatographic data, for example, is accomplished using a conventional strip chart recorder. As the resulting charts, called chromatograms, are recorded, long sheets of chart paper result. The storage, retrieval, and analysis of this information is a typical and difficult problem for the gas chromatograph user due to the bulk and length of the resulting charts. These same problems exist in a wide area of use, such as infrared, ultraviolet, spectrometry, and other forms of spectroscopy, or virtually any strip chart recording system.

To our knowledge, at the present time there is no existing device that satisfactorily records data such as is normally recorded on a strip chart, such as a chromatogram, in a form suitable for filing and retrieval, other than conventional microfilm techniques, which are expensive and involve the use of special equipment.

SUMMARY OF THE INVENTION

A method of recording in a recording system is provided for recording of data, such as chromatograms, in a form suitable for filing and later retrieval which is also particularly useful with simultaneous recording of the same data in continuous strip chart form. A source of input signals, which vary in amplitude in response to the variations in the factors being measured, can be recorded on a standard strip chart recorder. A second recorder (which can be the sole recorder if simultaneous strip chart recording is not desired) is operable in response to the signals from the aforementioned source and has a recording surface, such as a tabulating machine record card of the "IBM" or "McBee" type, of predetermined coordinate lengths. The second recorder has a control device to control the time scale coordinate so as to vary the time it takes to move the recording pen relative to the recording surface through the full available extent of the recording surface in the time coordinate duration in a period of time corresponding to the selected time length of the analysis. As an example, if the strip chart recorder operates at the rate of 1 inch per minute and the analysis time takes 120 minutes, the user would have 120 inches of chart paper depicting the complete spectrum of analysis. With the use of the second recorder and the variable time scale, the recorder can be set so that it will take a full 120 minutes to complete the analysis, yet the 120 minutes will be recorded within the predetermined coordinate length on the card of, say 6 inches. The amplitude will be recorded full scale and only the time or length will be changed or compressed. By placing mechanical keysort search indicia on such record cards indicative of selected characteristics of the recorded graphical data, cards can be readily retrieved from files thereof for detailed examination. It can be seen that the present invention will provide for the proportionate prereduction of data, graphic reproducible data, ready retrieval of the data, ready visual comparison, elimination of bulk original charts and readily available analysis data.

DESCRIPTION OF THE DRAWING

An illustrative embodiment of the present invention is shown in the following drawings, in which:

FIG. 4 is a circuit diagram in block form of one embodiment of the invention; and FIG. 5 is a circuit diagram of the embodiment shown in FIG. 4.

DESCRIPTION OF THE PREFERRED EMBODIMENT

The invention of this application will be described with particular reference to gas chromatography, but is not to be restricted to that use only.

A chromatograph unit consists typically of two major modules, commonly called an analyzer section and a control section.

The analyzer section comprises an oven and temperature control, flow adjustments, column pressure control and valve-actuating toggles. The oven contains a heater, thermal-conductivity detector cell, sample gas valve (which provides a fixed volume of sample gas), liquid sample injection port (for injecting vaporizable liquid samples), column-switching valves, and ample space for three or more columns. Valves in the oven are actuated by compressed air controlled by the above-mentioned toggles.

The control section includes a Wheatstone bridge, DC power supply, bridge voltmeter, recorder, and controls used with the thermal-conductivity cell.

Figure 1:
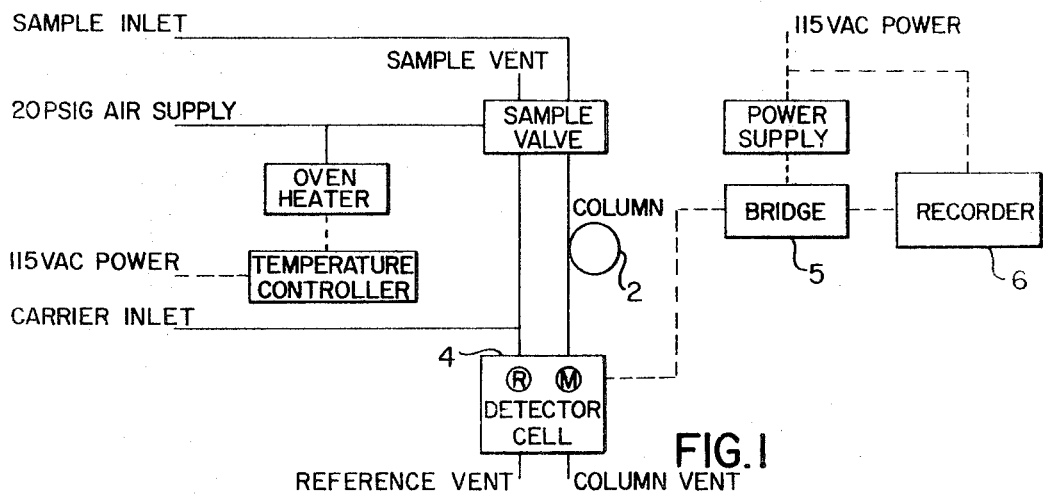
FIG. 1 is a simplified flow diagram of a chromatographic system.

Reference is made to FIG. 1 which shows the simplified flow diagram of a gas chromatograph. By way of explanation, it is seen that a typical gas chromatograph first passes a known volume of sample gas (the gas or vapor to be analyzed) into a tubular packed column 2. The sample is carried into the column by a constant flow of inert gas, called the carrier gas; and in the column, the sample is removed from the carrier gas by adsorption, absorption, or solution. As the flow of carrier gas continues, the various components of the sample are eluted (released) from the column —one at a time; or grouped as desired, and each component or group mixed with carrier gas is carried through a detector cell 4.

The most usual detector cell is a thermal-conductivity unit containing four hot wire detector elements, arranged in two series of two elements each. The flow from the column passes through one series of elements; and an equal flow of pure carrier gas passes through the other. The two pairs of detector elements are connected into opposite lengths of a Wheatstone bridge diagrammatically shown as bridge 5, and the bridge is brought into balance with puree carrier gas flowing through both sides of the detector.

When a sample component passes through the cell, the thermal conductivity in that side of the cell is no longer the same as it was with pure carrier gas. This unbalances the Wheatstone bridge. The output voltage resulting from this unbalance actuates a recorder pen or stylus, which usually draws a continuous graph on a moving strip chart recorder 6.

Thus, the instrument provides a pen-drawn record for each component of the sample mixture. The area bounded by the graph for each component shows the quantity of that component; and the distance of each component's graph from the starting point (that is, the component's retention time) serves to identify the component.

The column, detector cell, valves and connecting tubing are all held at a constant, elevated temperature inside an oven. The two gas streams from the detector cell go out through exhaust lines.

Figure 2:
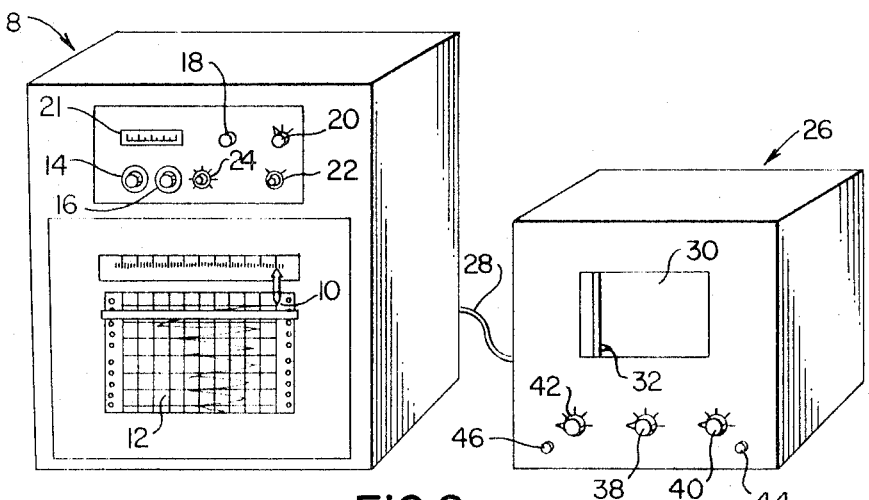
FIG. 2 is a perspective view of gas chromatograph and auxiliary recorder.

FIG. 2 is a perspective view of a gas chromatograph unit 8 currently produced and sold by the Process Instruments Division of The Bendix Corporation under the name "Chroma-Lab 1060" and comprising the components illustrated in FIG. 1. As previously described, the output voltage resulting from the unbalanced Wheatstone bridge actuates a recorder pen or stylus 10 which draws a continuous graph on the continuously moving chart paper 12 of recorder 6.

The control section of chromatograph unit 8 has coarse and fine zero adjustment, dials 14 and 16, for balancing the detector bridge circuit 5. When adjusted, the recorder pen 10 will be at zero when only carrier gas is flowing through both sides of the detector cell 4. A signal reverse switch 18 is provided so that only positive peaks are provided on the chart paper 12. The bridge voltage adjustment knob 20 selects the desired bridge range, and bridge voltmeter 21 provides a visual indication of the bridge voltage. Power switch 22 turns on the power to the control section. A recorder range multiplier 24 is also provided to permit the choice of signal amplitude ranges.

In the present invention a recorder 26 can be connected as the sole recorder responsive to the voltage signal changes or, as illustrated, it can be interconnected by line 28 with a chromatograph unit 8 to simultaneously produce a graphic chart or chromatogram on a recording surface or card 30 which is of the card type. "Card" or "sheet" as used herein means any recording medium having predetermined dimensions, as distinguished from a continuous strip, adaptable to filing and mechanical sorting by tabulating machines, such as "McBee" or "IBM" type cards. These cards have predetermined coordinate lengths and the card lengths are not varied. Recorder 26 is adapted to have record card 30 mounted thereon in any conventional manner having means for precise alignment of the two coordinates. For instance, the recorder may have guides in which the card fits or pegs may cooperate with corresponding holes or notches in the card. A hinged drop plate can also be provided for use as a chart holddown device. The previously described output voltage resulting from the unbalanced Wheatstone bridge 5 also actuates a recorder pen or stylus 32 which draws the chart on record card 30 in a manner to be described below.

Figure 3:
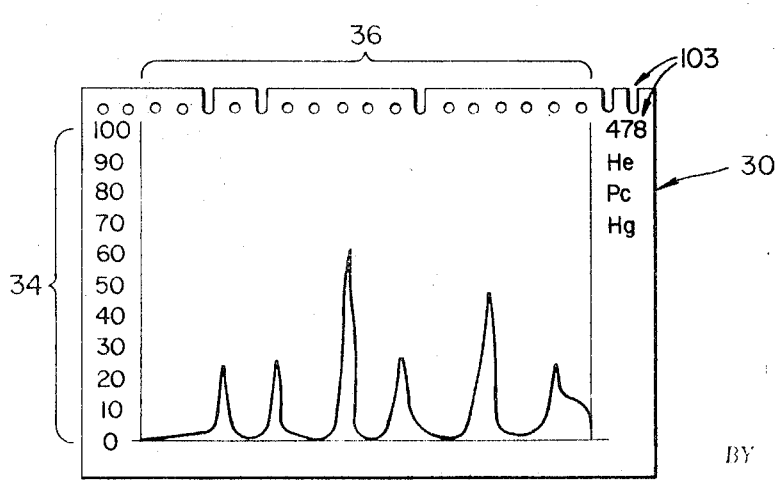
FIG. 3 is an example of a chromatogram taken from the auxiliary recorder.

FIG. 3 is a sample of a complete spectrum analysis chart or chromatogram, on record card 30. The card coordinates representing full amplitude or bridge unbalance and time, 34 and 36 respectively, are fixed and the lengths cannot be physically changed. The scale factor of amplitude coordinate 34 may be varied to assure full-scale sensitivity of the recorder by adjusting control 38. The sensitivities or ranges can be selectable, for example, at 0—1 mv. to 0—10 mv. in steps of 1, 2, 5, 10 mv.

The time coordinate range is adjusted by time control 40 which is calibrated in minutes. As an example, control 40 can be calibrated from 2 to 128 minutes. Thus, any time can be chosen as the required time for pen 32 to traverse the usable time-coordinate length of card 30 and thereby encompassing a large range of possible analysis time. Hence, if an analysis time takes 128 inches of chart paper 12, assuming the recorder unit continuously runs at a constant rate of 1 inch per minute. By setting control 40 at the 128 mark, recorder 26 will record for 128 minutes but the resulting chromatogram will be completely reproduced within the time coordinate 36. Thus, it is seen that by proper selection of the time control 40, maximum expansion or contraction of the time coordinate to fit the available recording space will occur and the information recorded upon the card 30 will utilize the maximum time coordinate length.

Recorder 26 also has an on-off switch or mode control 42, a pen zeroing control 44, and a servo-gain (damping) control 46 which all perform well-known functions which need not be elaborated herein.

FIGS. 4 and 5 show one exemplary embodiment of circuitry, in block and detailed form, for carrying out the principles of this invention. In this example, a signal from a source, which in this embodiment is the Wheatstone bridge 5, shown in FIG. 1, is fed to a signal amplifier 48 having a feedback network 50 which controls the gain and stability of the amplifier. As seen in FIG. 5, a potentiometer 52 is connected with amplifier 48 to provide for zero adjustment. A variable resistor 54 cooperates with feedback network 50, including a fixed resistor 56, to provide for span adjustment or gain so that the signal amplitude from amplifier 48 will give a full scale pen drive. As an example, if amplifier 48 is set to accept a one-half mv. full scale, then the final output will drive the pen full scale in the amplitude coordinate at one-half mv.

The output signal from amplifier 48 feeds either recorder 26 where it alone is used or, as in the illustrative application, it feeds both recorders 6 and 26 to serve as the input signal for driving the recorder pens in the amplitude coordinate which denotes the unbalance of the Wheatstone bridge 5. Recorder 6 is any commonly available standard strip chart recorder and need not be fully described herein. It is sufficient to say that the strip chart drive mechanism of this recorder runs at a continuous and constant speed and thereby provides an effectively limitless time coordinate.

Recorder 26 has two separate circuits, an amplitude or signal servo circuit 58 and a time servo circuit 60.

The signal circuit 58 is responsive to the output signal from amplifier 48. The signal from amplifier 48 passes through attenuator or resistor 62 to an amplifier 64. The signal from amplifier 64 controls a DC motor 66 which drives pen 32 in the amplitude coordinate 34 through any known linkage, such as mechanical, and shown here diagrammatically as dotted line 68. A feedback network 70 comprising a potentiometer 72 and resistor 74 between motor 66 and amplifier 64 insures that pen 32 does not traverse off the card in the amplitude coordinate.

The time servo circuit 60 includes a second DC motor 76 which is linked to the recorder pen 32 carriage by any known linkage, not shown, indicated by dotted line 78 to drive the pen in the time coordinate direction so as to cause the pen to scan the card in response to time axis signals thereto. The time signals are independently generated within the time circuit 60 and in this exemplary embodiment from a ramp generator arrangement.

The ramp generator comprises a time attenuator 79 or potentiometer 80 and resistor 82, an amplifier 84 and time generation feedback network 86. The time signal from amplifier 32 is fed to amplifier 88 which in turn drives motor 76. Feedback circuit 90 comprising potentiometer 92 and resistor 94 provides signal feedback for null balancing and combines with the time feedback network 86 to limit the amount of travel of the pen carriage in the time coordinate axis.

It is seen that the output from amplifier 84 moves in two directions, i.e., to the feedback network 86 and in particular to capacitor 96 and also to the motor drive amplifier 88. The time it takes capacitor 96 to charge is dependent on the setting of potentiometer 80 and the voltage applied to amplifier 84. Thus, when capacitor 96 reaches full charge, it then in effect shuts off amplifier 84 and there will be no further output signal to amplifier 88 and the motor 76 will stop. Capacitor 96 will remain charged until bypass switch 98 is closed and capacitor 96 can discharge around this path. When switch 98 is opened again, the time signal will again start. Thus it can be said that the time signal is the backfeed or capacitor charge and, once this circuit is in operation, there is a given amount of charge or charge rate and this will be fed into the motor drive amplifier for the entire time the time circuit is operating.

It is possible to run one axis of the recorder without the other. The signal circuit 58 can be run along and pen 32 will move up and down on one line because there is no time signal to cause the pen carriage to traverse in the time coordinate. Likewise, if only the time circuit 60 is engaged, pen 32 will make a single line along the time coordinate. Circuits 58 and 60 are electrically connected by any means such as switch 100 so that the two circuits will be connected for synchronous operation.

There is also provided apparatus diagrammatically shown as 102 for placing on card 30 keysort search and retrieval data 103 or information to permit the ready retrieval of individual cards from file collections of such cards. The data placed on the card can include such things as customer, spectrum or gases found, etc. This data may be placed on the cards as magnetic impressions, code letters, holes in the card, etc., and the apparatus for placing this data on the cards is readily available and need not be discussed herein.

Apparatus, of a known type, as shown as 104 and responsive to the keysort search and retrieval data 103 is utilized to retrieve selective cards from file collections.

In operation of an exemplary application of the method and apparatus of this invention, a gas to be analyzed is inserted in the chromatograph unit 8 after the proper adjustments have been made thereto with only a carrier gas flowing therethrough. The strip chart recorder 6 continues to run until it is determined that the unit is satisfactory and a proper spectrum or chromatogram is being charted. It can also be determined at this point the total time it takes to obtain a complete spectrum of the base being analyzed. The time is set on recorder 26 and the spectrum is charted on record card 30. The keysort search and retrieval data 103 is placed on the record card and the card may then be filed. When this card is wanted at a later date, retrieval apparatus 104 will sort through the file collection and select the desired card.

Thus, this invention provides a method and apparatus for recording selected proportionate and prereduction of data on record cards. Through simultaneous records when desired this data can correspond to the date on a continuously running strip chart. Keysort search and retrieval data is placed on the record cards so that they may be filed and later retrieved for examination.

While the form of apparatus herein described constitutes a preferred embodiment of the invention, it is to be understood that the invention is not limited to this precise form of apparatus.

What we claim is:

1. A recorder for recording graphical data in form for filing and mechanical retrieval comprising:
   means to receive input signals from a source which vary in amplitude in response to variations in a factor to be measured,
   means for mounting in recording position a tabulating machine record card having predetermined coordinate lengths wherein one coordinate represents amplitude and the other coordinate represents time, the available recording length being the same for each recording operation;
   a stylus for tracing directly on said card a continuous, directly visible graphical record representing the variations of said input signal with time;
   first drive means operable in response to said means to receive input signals to provide relative movement between said stylus and said card in the amplitude coordinate direction, said movement being directly proportional to the amplitude of said input signal,
   second drive means operable in response to an independent time signal providing relative movement between said stylus and said card in the time coordinate direction wherein the resulting graph depicts input signal variations measured with respect to time;
   first control means operatively associated with said drive means for initiating recording at a first boundary of said time coordinate and the record area of said card;
   limit means for automatically terminating recording at a second recording boundary a predetermined displacement from said first boundary and utilizing the full displacement available on said recording area in that coordinate; and
   second control means operatively associated with said second drive means for manually preselecting the time duration of recording between said boundaries, said second control means being calibrated in terms of time duration; whereby a time signal representing any time duration may be provided to said second drive means to cause the relative movement in the time coordinate direction to travel the full predetermined coordinate length during each recording operation whereby a resulting visual record of any time duration may be placed on said recording surface to extend throughout the full predetermined time coordinate length for maximum expansion of the graphical data in the time coordinate direction during each recording operation.

2. A recorder as set forth in claim 1 further comprising:
   an amplifier circuit connected between said means to receive input signals and said first drive means; and
   adjustment means operatively connected to said amplifier circuit providing span adjustment of said input signal wherein the signal transmitted to said first drive means is adjusted whereby the relative movement between said stylus and said recording surface in the amplitude coordinate direction will traverse within said recording surface amplitude length.

3. A recorder as set forth in claim 1 in which said tabulating machine record card comprises a card dimensional to conform with cards in use for machine accounting and similar purposes and further comprising means for placing identification indicia upon said card representative of the recorder data thereon and thus providing for storage and later retrieval by machine for examination thereof.

4. A recorder as set forth in claim 1 in which said second control means comprises:
   a ramp generator providing the time duration of recording between said boundaries;
   said ramp generator comprising a time amplifier,
   a time generation feedback circuit connected around said time amplifier, and
   a time signal adjustment means.

5. A recorder as set forth in claim 4 in which said time generation feedback circuit comprises:
   a feedback capacitor interposed in the circuit around said time amplifier and in which the capacitor charge time is dependent upon setting of said time signal adjustment means and the potential applied to said time amplifier;
   said time amplifier output providing its output to both said second drive means and said time feedback circuit wherein when said capacitor reaches full charge said time amplifier is turned off whereby no further signal is transmitted to said second drive means; and
   bypass means around said capacitor providing a discharge path for said capacitor.